United States Patent [19]
McDonald et al.

[11] Patent Number: 5,826,894
[45] Date of Patent: Oct. 27, 1998

[54] ALIGNMENT CAM POSITION LIMITER

[75] Inventors: David A. McDonald, Lake Orion; Roman T. Kogut, Sterling Heights; Darryl B. Smith, Highland, all of Mich.

[73] Assignee: Chrysler Corporation, Auburn Hills, Mich.

[21] Appl. No.: 975,124

[22] Filed: Nov. 20, 1997

[51] Int. Cl.⁶ .................................................. B62D 17/00
[52] U.S. Cl. ................................ 280/86.756; 280/86.75; 280/86.754
[58] Field of Search ........................ 280/86.754, 86.75, 280/86.751, 86.756, 86.758, 86.753

[56] References Cited

U.S. PATENT DOCUMENTS 4,679,327  7/1987  Fouchey et al. .
4,973,075  11/1990 Rori et al. .
5,327,655  7/1994  Buchesky et al. .

Primary Examiner—Eric D. Culbreth
Attorney, Agent, or Firm—Lawrence J. Shurupoff

[57] ABSTRACT

A toe adjustment assembly including a frame and a pair of lateral links pivotally mounted to the frame. A bore is formed in at least one of the links. A shaft is extended through the bore. A cam is rotatably mounted between the shaft and the bore. The bore includes an engagement surface extending radially between the shaft and the link, limiting rotation of the cam around the shaft by engaging the shaft with the engagement surface and by wedging the cam between the shaft and the bore.

10 Claims, 3 Drawing Sheets

ALIGNMENT CAM POSITION LIMITER

FIELD OF THE INVENTION

The present invention relates to vehicle suspension adjustment devices, and more particularly to vehicle toe adjustment assemblies.

BACKGROUND AND SUMMARY OF THE INVENTION

Toe adjustment assemblies are used in conjunction with automotive suspension systems to provide the correct toe position of the vehicle wheels. The toe position of a wheel depends on whether the vehicle is a front wheel driven vehicle or rear wheel driven vehicle. Toe adjustment compensates for kinematic forces that are applied to the wheels. To adjust the toe position, a toe adjustment assembly will commonly include a cam that is rotated to achieve the desired toe position.

A deficiency with current toe adjustment assemblies is the dynamic effect on the suspension system of adjusting the cam to the desired toe position. Toe adjustment assemblies having a cam operate by positioning a shaft or bolt that is axially spaced depending on the position of the cam. It can be understood by those skilled in the art that by adjusting the cam, the geometry of the suspension system is also affected. The same amount of toe position can be achieved at two cam positions, i.e. one position in the upper hemisphere and one in the lower hemisphere; however one of the two cam positions resulting in the desired toe position results in a compromise to the suspension geometry and might produce undesirable vehicle handling characteristics.

Therefore, there is a desire for a toe adjustment assembly that provides adequate toe adjustment while providing absolute assurance that a toe adjustment does not result in a compromise to the suspension system geometry such as bump steer, roll steer and roll center.

Accordingly, the present invention provides a toe adjustment assembly including a frame and a pair of lateral links pivotally mounted to the frame. A bore is formed in at least one of the links. A shaft is extended through the bore. A cam is rotatably mounted between the shaft and the bore. An engagement surface is provided in the bore and extends radially between the shaft and the link, limiting rotation of the cam around the shaft by engaging the shaft with the engagement surface and by wedging the cam between the shaft and the bore.

Another object of the present invention is to provide a cam assembly comprising a hollow sleeve having a bore formed therethrough. An engagement surface is provided in the bore and defines a radial constriction therein. A shaft extends through the sleeve and a cam finger is rotatably mounted on the shaft. The cam finger is interposed between the shaft and the sleeve and is axially spaced from the radial constriction, such that rotation of the finger around the shaft is limited by engagement of the shaft against the engagement surface.

Further areas of applicability of the present invention will become apparent from the detailed description provided hereinafter. It should be understood, however, that the detailed descriptions, specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and accompanying drawings, wherein.

DETAILED DESCRIPTION OF THE PREFERRED EMBODIMENT

Figure 1:
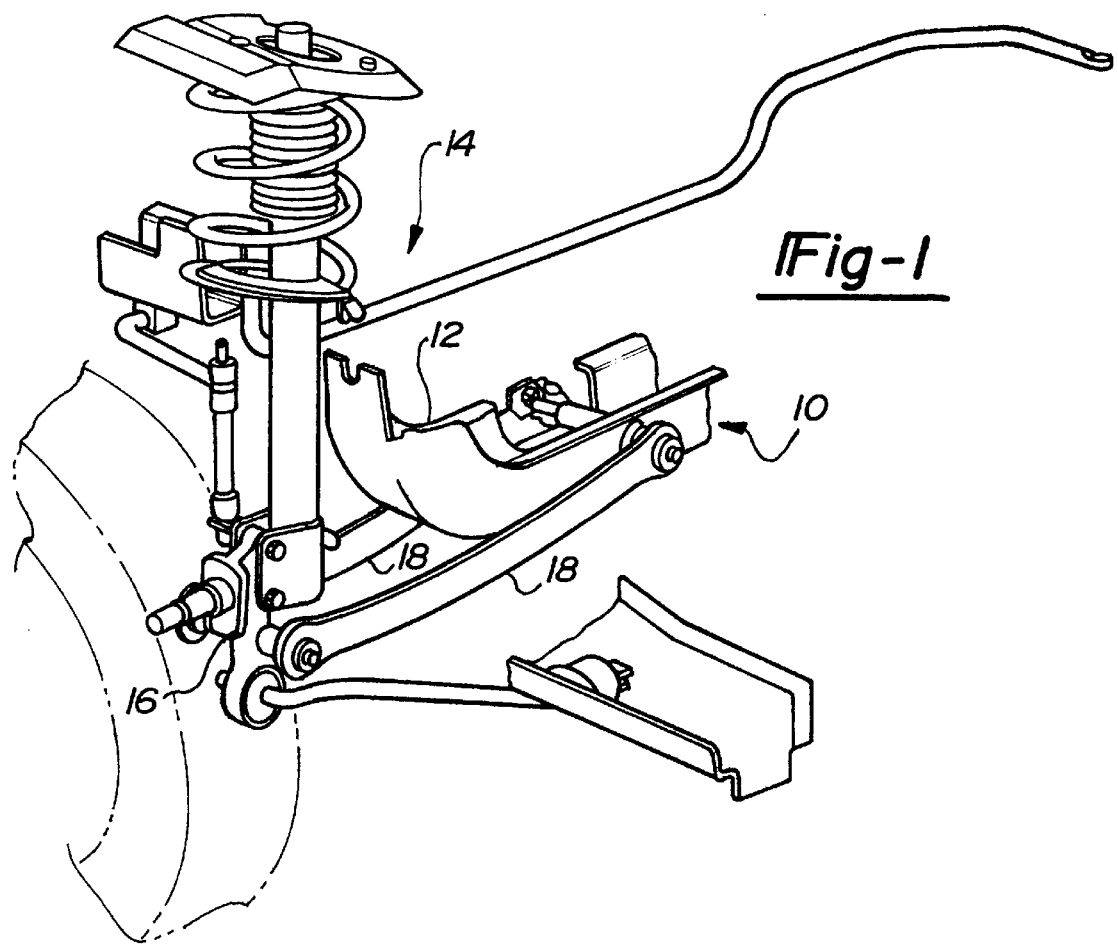
FIG. 1 is an illustration of a vehicle suspension system incorporating the toe adjustment assembly according to the principles of the present invention.
Figure 4:
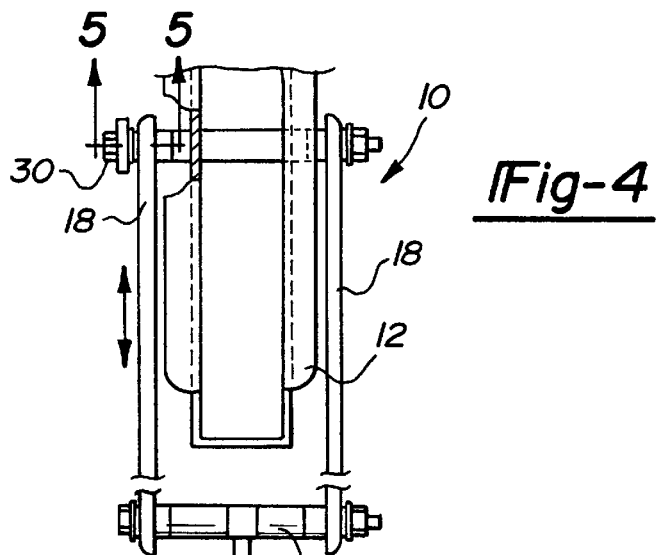
FIG. 4 is a plan view of the toe adjustment assembly according to the present invention.

Referring to FIG. 1, a toe adjustment assembly 10 according to the preferred embodiment of the present invention is shown. The toe adjustment assembly 10 is depicted in operative association with a conventional suspension assembly 14. The toe adjustment assembly 10 includes a frame 12 by which the toe adjustment assembly 10 is adapted to be operatively connected to a vehicle (not shown). Referring also to FIG. 4, a pair of lateral links 18 is pivotally mounted to frame 12 at a first end and is adapted to be mounted to a knuckle 16 at a second end. The first end of at least one of a pair of lateral links 18 includes a bore 26 formed therethrough. Alternatively, at least one of a pair of lateral links 18 may have a hollow sleeve 24 having a bore 26, wherein the hollow sleeve 24 is fixedly secured to a first end of at least one of the pair of lateral links 18. An engagement surface 28 is provided in the bore 26 and defines a radial constriction therein. The engagement surface 28 is a generally flat surface formed within bore 26. The sleeve 24 may be fixedly attached to a first end of at least one of the pair of lateral links 18 by any known method, including a press fit. The sleeve 24 is preferably manufactured by powdered metal technology, however it should become apparent to those skilled in the art that any suitable method for manufacture of the sleeve 24 may be substituted for powdered metal technology.

Figure 2:
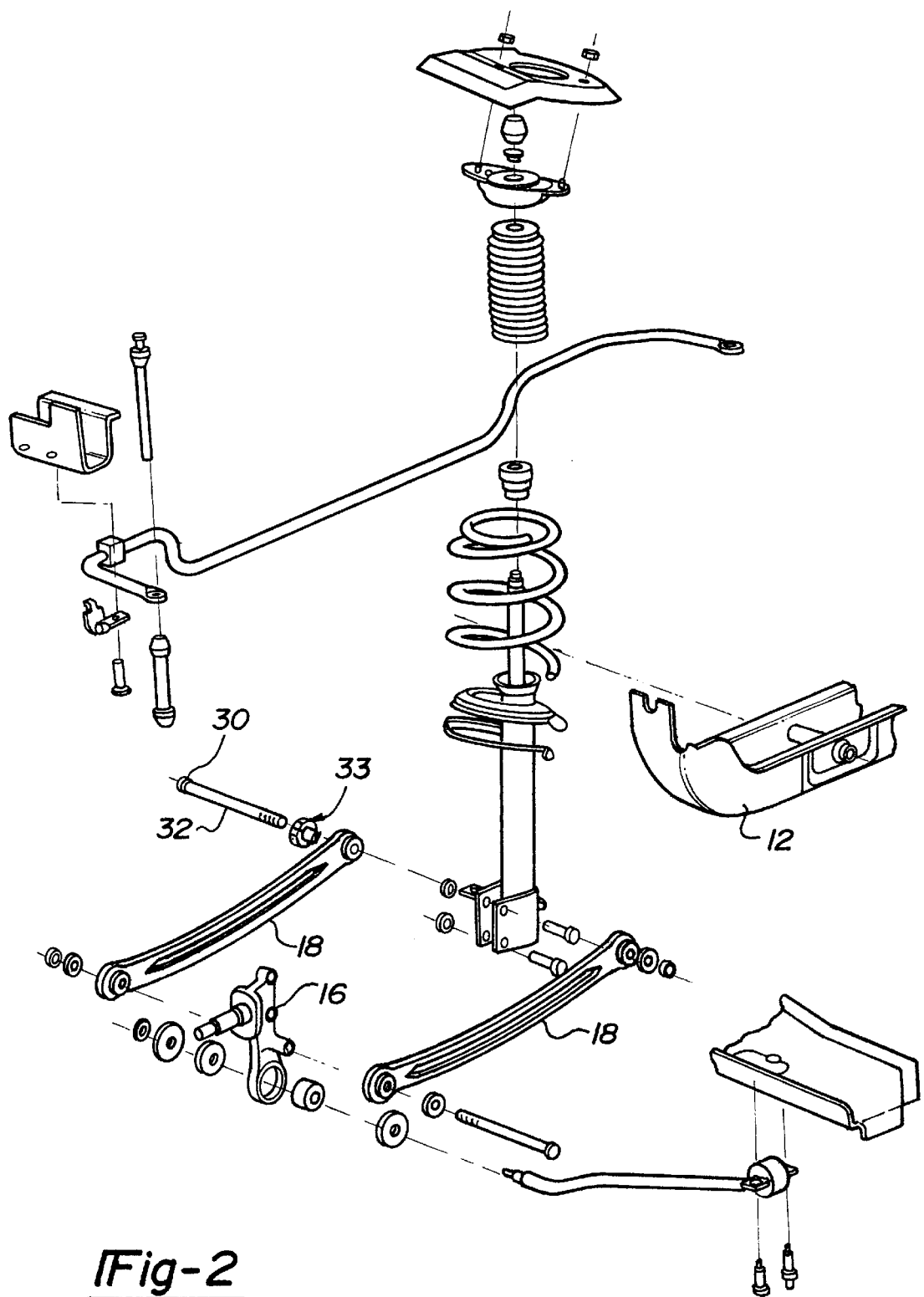
FIG. 2 is an exploded view of a vehicle suspension system embodying the toe adjustment assembly according to the principles of the present invention.

Referring now to FIG. 2, a bolt 30 having a shaft 32 extends through a first end of at least one of the pair of lateral links 18. A cam member 33 is rotatably mounted on the shaft 32. The cam member 33 includes a base portion 33A having a central opening 33B for receiving the shaft 32 and is provided with a cam finger 34 which extends from the base portion 33A and is interposed between the shaft 32 and at least one of the links 18. Alternatively, the cam member 33 may be rotatably mounted between the shaft 32 and the sleeve 24.

Figure 3:
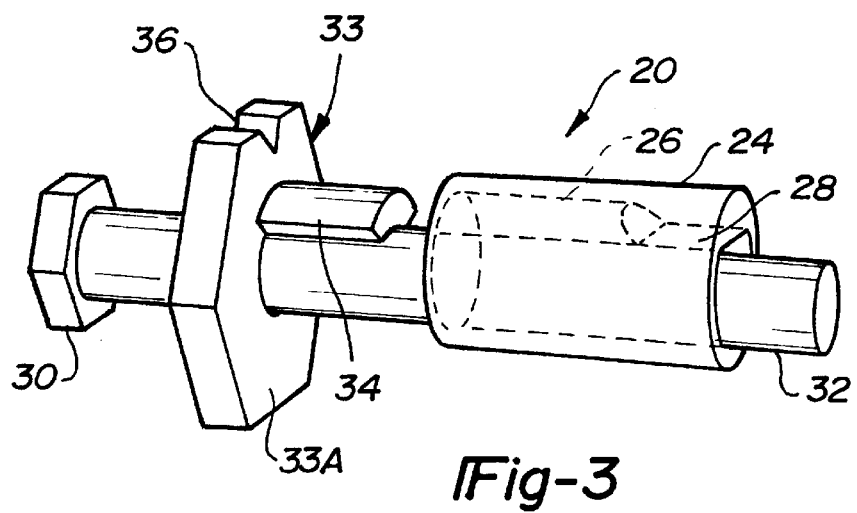
FIG. 3 is an isometric view of the cam assembly according to the present invention.
Figures 5, 6:
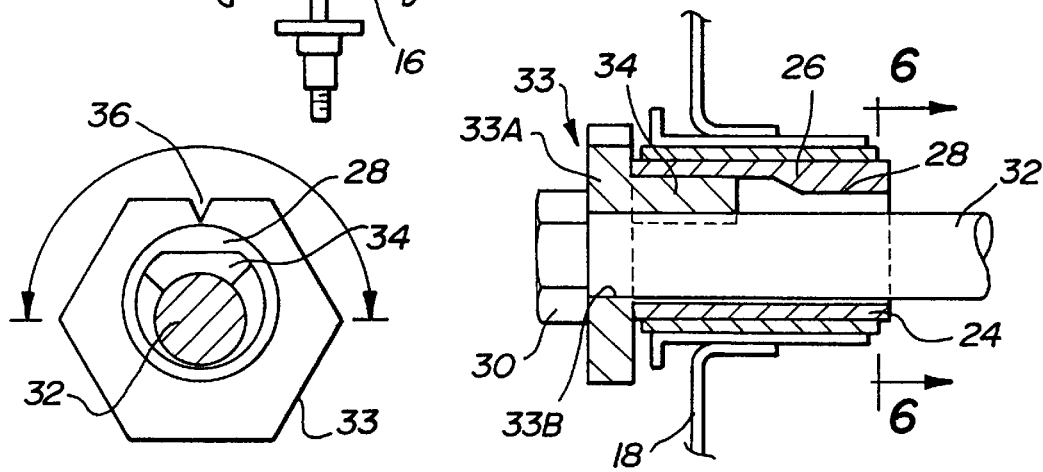
FIG. 5 is a cross-sectional view of the cam assembly according to the present invention.
FIG. 6 is an illustration of the cam assembly according to the present invention where the cam is adjusted to zero toe (12 o'clock)

Referring now to FIG. 3, to adjust the amount and direction of toe in the vehicle suspension system, the cam member 33 is rotated about the shaft 32 creating a radial offset of at least one of the links 18 proportional to the thickness of the cam finger 34. Referring now to FIG. 5, a cross-sectional view of a cam assembly 20 is shown where the cam finger 34 is oriented at a 12 o'clock position. When the cam finger 34 is in the 12 o'clock position, the cam member 33 is said to be at a normal adjustment providing zero toe adjustment. The cam finger 34 is interposed between shaft 32 and at least one of the links 18 whereby the cam finger 34 functions to radially position at least one of the links 18. The sleeve 24 is installed in a predetermined operating orientation and does not rotate with respect to the one of the links 18 in which the sleeve 24 is installed. One skilled in the art will immediately recognize that the sleeve 24 may be installed in any orientation. However, in the preferred embodiment, sleeve 24 is oriented such that engagement surface 28 is located at a 12 o'clock position. The bore 26 is formed to allow the cam member 33 to rotate about shaft 32 having cam finger 34 interposed between sleeve 24 and shaft 32. FIG. 6 illustrates cam member 33 in a partial cross-sectional view where the cam member 33 is located in a normal position.

The engagement surface 28 defines a radial constriction that prevents cam member 33 from being improperly adjusted or inserted incorrectly. That is, the radial constriction prevents the cam member from being inverted through the wrong end, i.e., the end in which the constriction is located. Furthermore, the cam cannot be inserted into the opposite free, open end in the lower hemisphere due to interference between the shaft and sleeve. This feature ensured proper assembly and alignment of the cam finger within the sleeve.

Figure 7:
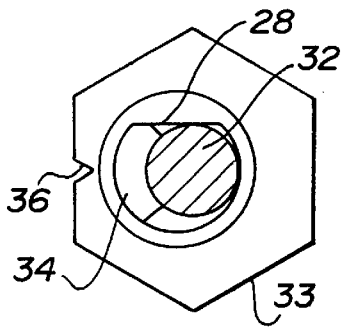
FIG. 7 is an illustration of the cam assembly according to the present invention where the cam is adjusted to a maximum toe-out position limited by engagement of the shaft against the engagement surface (cam position at 9 o'clock)
Figure 8:
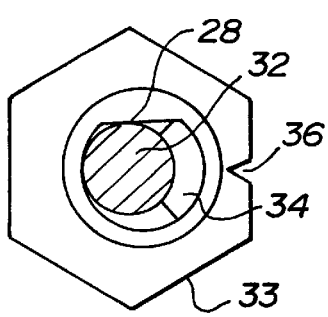
FIG. 8 is an illustration of a cam assembly according to the present invention where the cam is adjusted to the maximum toe-in position limited by engagement of the shaft against the engagement surface (cam position at 3 o'clock).

Referring now to FIG. 7, cam member 33 is shown adjusted to 9 o'clock as indicated by a notch 36 resulting in a maximum toe-out adjustment. Shaft 32 is wedged against engagement surface 28 resulting from a counterclockwise rotation of cam member 33, thus preventing cam member 33 from being rotated beyond the 9 o'clock position. Additionally, FIG. 8 illustrates the cam member 33 adjusted to a 3 o'clock position to provide maximum toe-in. By rotating cam member 33 in a clockwise direction the shaft 32 is wedged against engagement surface 28, also preventing cam member 33 from being rotated beyond the 3 o'clock position. In particular, when the shaft 32 comes into contact with engagement surface 28, the cam finger 34 is prevented from further clockwise rotation.

The engagement surface 28 limits the rotation of the cam to 180 degrees allowing a full range of toe adjustment while avoiding compromise to the suspension geometry. The contribution of the present invention becomes more readily apparent when considering the effects of jounce and rebound on the toe position of a vehicle. Toe curves which toe in with jounce travel produce an oversteer contribution which is generally not desirable for stability.

In the absence of engagement surface 28, the left and right toe positions may be adjusted to a correct toe specification and have dissimilar toe curves. This is because a cam adjustment at 7 o'clock yields the same toe-out as the cam adjustment to 11 o'clock. However, in doing so, the suspension geometry is compromised resulting in a different toe curve for the suspension on the left side of the vehicle than on the right side of the vehicle. A mismatch in the left and right toe curves leads to an exacerbated bump-steer condition. The addition of engagement surface 28 of the present invention prevents a mismatch in the left and right toe curves. The suspension system geometry compromises which produce undesirable toe curves result from vertical translation of at least one of the pair of links 18 when the cam member 33 is rotated to produce the required lateral translation that creates the desired toe adjustment. Therefore, by limiting the cam rotation to 180 degrees, full vertical motion is reduced by 50 percent while still obtaining full horizontal adjustment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cam assembly, comprising:
    a hollow sleeve having a bore formed therethrough;
    an engagement surface provided in said bore and defining a radial constriction therein;
    a shaft extending through said sleeve; and
    a cam finger rotatably mounted on said shaft and interposed between said shaft and said sleeve and axially spaced from said radial constriction, such that rotation of said finger around said shaft is limited by engagement of said shaft against said engagement surface.

2. The cam assembly according to claim 1, wherein said engagement surface is generally flat.

3. The cam assembly according to claim 1, wherein rotation of said cam finger around said shaft is generally limited to 180 degrees.

4. The cam assembly according to claim 1, wherein said cam finger is fixed to a cam member having a base portion provided with an opening therethrough.

5. The cam assembly according to claim 1, wherein said engagement surface is formed integrally with said hollow sleeve.

6. A toe adjustment assembly, comprising:
    a frame;
    a pair of lateral links pivotally mounted to said frame;
    a shaft extending through a bore in at least one of said links;
    a cam rotatably mounted between said shaft and said at least one link; and
    an engagement surface provided in said bore extending radially between said shaft and said at least one link and limiting rotation of said cam around said shaft by engagement of said shaft with said engagement surface and by wedging of said cam between said shaft and said at least one link.

7. The toe adjustment assembly according to claim 6, wherein said engagement surface is generally flat.

8. The toe adjustment assembly according to claim 6, wherein rotation of said cam around said shaft is generally limited to 180 degrees.

9. The toe adjustment assembly according to claim 6, wherein said cam is fixed to a cam member having a base portion provided with an opening therethrough.

10. The toe adjustment assembly according to claim 6, wherein said engagement surface is formed integrally within said bore.

* * * * *